June 18, 1957 B. L. McKINNON 2,796,294
SQUEEZE BOTTLE NEBULIZER
Filed Oct. 15, 1954 2 Sheets-Sheet 1

BAIN L. MC KINNON
INVENTOR.

BY Smith & Tuck

June 18, 1957  B. L. McKINNON  2,796,294
SQUEEZE BOTTLE NEBULIZER
Filed Oct. 15, 1954  2 Sheets-Sheet 2

BAIN L. MC KINNON
*INVENTOR.*

BY Smith & Tuck

United States Patent Office 2,796,294
Patented June 18, 1957

2,796,294
SQUEEZE BOTTLE NEBULIZER

Bain L. McKinnon, Seattle, Wash.

Application October 15, 1954, Serial No. 462,424

10 Claims. (Cl. 299—88)

This present invention relates to the general art of nebulizers and more particularly to a nebulizer head especially arranged for association with the polyethylene squeeze bottle as now established on the market. In order to be practically associated with the polyethylene type of bottle, the parts of this nebulizer are also preferably made of plastic material despite its inherent limitations in design. Arrangements are made, however, to first produce a primary mixture of liquid and air and this is further diluted and emulsified at high turbulence in a small emulsion chamber. Communication is then made from this relatively small emulsion chamber to a larger chamber wherein a true nebulizing action takes place and finally the spray is projected from the outlet orifice as a very fine aerosol which lends itself to broad application including use with solutions of adrenaline, as used in the treatment of asthma, or for the projection of very fine sprays of the more expensive perfumes.

Atomizing devices that are currently being used with the polyethylene form of distortable bottle have been able to produce only comparatively coarse sprays. These sprays are suitable for certain applications but fail entirely when used in the treatment of asthma and for like respiratory diseases. Further, because of the expense of the basic perfumes, it has not been practical with normal procedures to use the plastic form of atomizers for the projection of perfume mist. Adaptation of the nebulizer to polyethylene squeeze bottle spray devices of this type has been hindered because of inherent limitations of size and requirement of adequate and positive closure. In this present nebulizer, steps have been taken to produce first a high order of dispersion of the liquid in air and then to project this into the nebulizing chamber in which a separation and further dispersion is made, and then to project this stream through the outlet orifice for use. It is believed that a very worthwhile advancement has been made in this field and one which will make it possible to produce an effective device at a low cost and so suited to commercial product marketing practice as to attain general and widespread use.

An object of my present invention therefore is to provide a nebulizer adaptable to use integral with the present polyethylene squeeze bottles.

A further object of this invention is to provide as an elemental component, an atomizer of superior character for the production of a fine spray.

A further object of my present invention is to provide a complex jet system where a primary mixture of liquid and air is made first, and this is further emulsified in a chamber and then mixed with secondary air, whereupon this turbulent emulsion is forced through the main spray jet.

A further object of this present invention is to provide means for lowering the liquid to air ratios of the primary spray and concurrent increased dispersion and in this manner to obtain a greater quantity of usable aerosol dispersion as a result.

A further object of this invention is to provide a compact, simple to use nebulizer that is convenient to carry and is positively leakproof in its carrying condition.

Further objects, advantages and capabilities will be apparent from the description and disclosure in the drawings, or may be comprehended or are inherent in the device.

Figure 1:
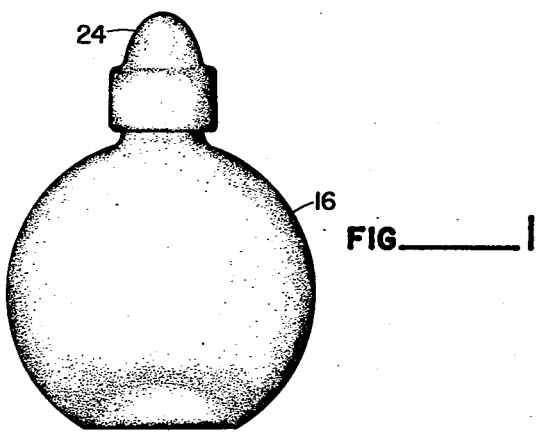
Figure 1 is a perspective view illustrating a squeeze bottle nebulizer made after the teachings of this present invention.
Figure 2:
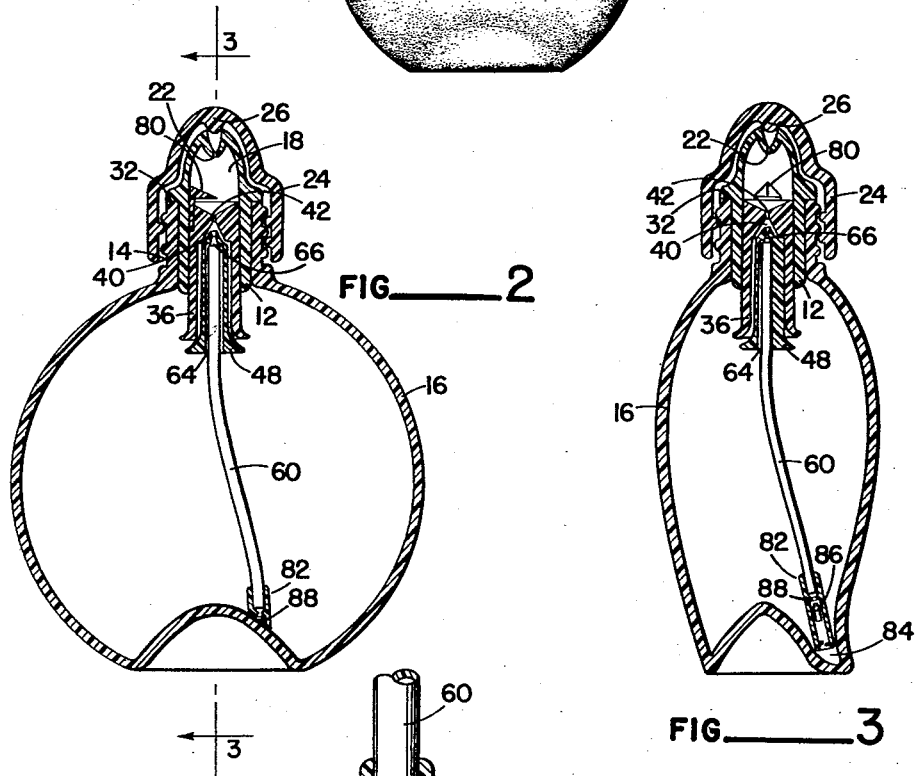
Figure 2 is a vertical cross sectional view made along the major axis of the bottle associated with this nebulizer.
Figure 3:
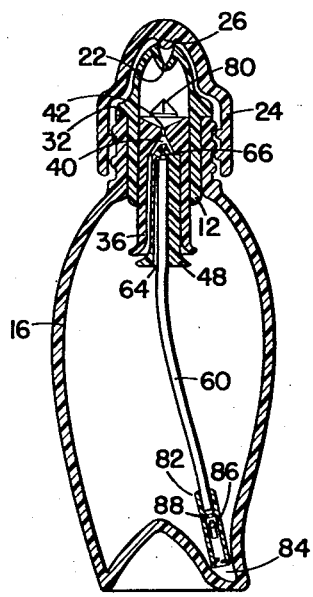
Figure 3 is a cross sectional view taken at right angles to the view of Figure 2 as along the line 3—3 of Figure 2.
Figure 4:
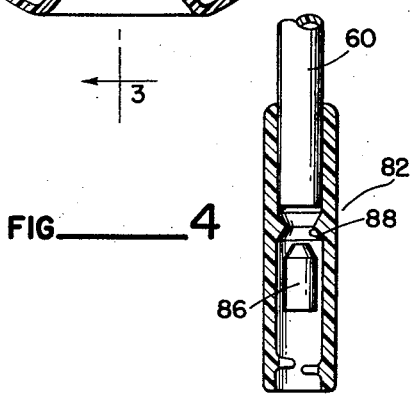
Figure 4 is an enlarged cross sectional view of the foot valve in the end of the liquid supply tube.
Figure 5:
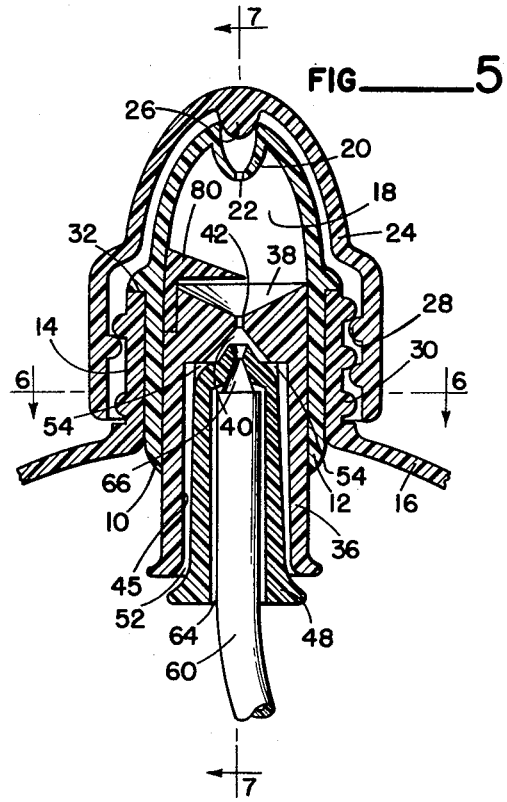
Figure 5 is a typical cross sectional view through the nebulizer head employed in this device.
Figure 8:
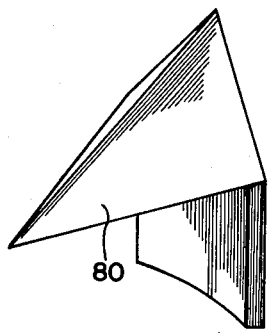
Figure 8 is an enlarged perspective view of the deflector or impingement target used in this device.

Referring more particularly to the disclosure in the drawings, the numeral 10 designates the stopper member forming the general base upon which the nebulizer head is assembled. This member has a generally cylindrical portion 12 adapted to be seated snugly in the neck portion 14 of a polyethylene bottle 16. At its upper end the stopper member is provided with a nebulizing chamber 18 of considerable volume and extending down into this chamber is a generally conical discharge tube member 20 at the extreme inner end of which is the outlet orifice 22.

Enclosing the stopper member largely is the closure cap 24. This cap is provided with a detent portion 26 of a conformation adapted to form a complete seal for the discharge openings 20 and to thereby seal orifice 22. To insure a complete closure at this point and one that will not become displaced, interior threads as 28 are formed in the plastic material and these engage complementary threads 30 formed as part of neck 14 of the bottle 16. In order that there would be no downward displacement of the stopper member when pressure is applied on these threads, an annular flange is provided as 32 to arrest any such movement and to provide a still more secure seal.

Figure 6:
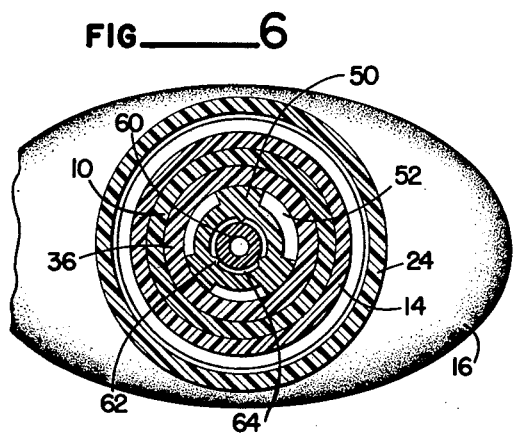
Figure 6 is a cross sectional view taken along the line 6—6 of Figure 5.
Figure 7:
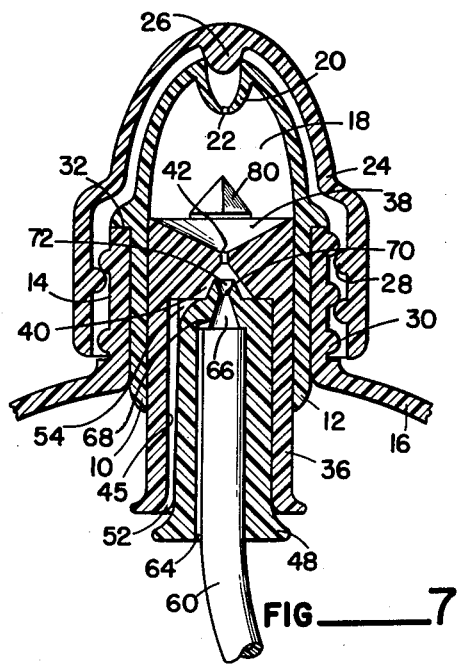
Figure 7 is a vertical sectional view taken along the line 7—7 of Figure 5.

Firmly seated within the cylindrical portion of stopper 10 is the main jet member 36. At its upper end member 36 is provided with a conical depression as 38 and disposed concentrically therewith but oppositely faced, is a second conical chamber 40. Communicating between chambers 40 and depression 38 is the main jet orifice 42. The main extent of the lower portion of member 36 is formed as a cylindrical recess 45 in which is seated the emulsion jet member 48. Reference to Figure 6 will indicate these forms, the cross sectional form of member 48 being provided with the bearing portions as 50 and the air passageways 52. At their upper ends, passageways 52 are faired into the conical chamber 40 as is indicated at 54. Actual control of the flow of air through passageways 52 is controlled by the amount of clearance provided at these points which in turn provides the control on the liquid to air ratio that will be obtained in the final discharge spray.

Disposed within a cylindrical bore, axially disposed with respect to member 48 is the liquid supply tube 60. This tube is spaced away from the cylindrical wall portions of the bore in member 48 as by a plurality of lands 62 so that in effect a plurality of air passageways, as 64, is provided. The liquid which is forced upward through tube 60 is discharged into a nozzle-like conical tube 66. Here again clearance is provided, as at 68, so that air driven up through passageways 64 may enter the emulsifying chamber 40. It first, however, mixes in chamber 66 with the liquid passing upward through tube 60 and then it passes through nozzle-like chamber 66, through orifice 70, out through the inverted conical discharge passage 72.

In order to prevent a direct "blow through" the nebulizer head and out orifice 22, a baffle 80 is provided. This is formed preferably as a triangular element extending out into the jet stream and a preferred form is generally shown in Figures 5, 7, and 8. This form also acts as a disintegrator.

The action of tube 60 and flask 16 is similar, to a degree, to a Florence flask in that pressure is placed on the contents of the flexible bottle 16 by manual pressure and the liquid is forced up and out tube 60. A foot valve 82 is provided for tube 60 and an enlarged portion 84 is provided in the bottom of bottle 16 to accommodate and position it. This valve normally operates at or near the end of a cycle to prevent an unwanted surge of liquid which may be caused by syphon action, once a fast flow of liquid is started. At such times the movable valve member 86 is mechanically carried upwardly until it seats on valve seat 88. When the excess draft is checked the valve is released and falls, by gravity, from the seat. The enlargement 84 gives an outside visual and feelable indicator of the side of the bottle which should be held downmost when in use.

*Mode of operation*

When the type of liquid that is going to be used in the device has been determined, the size of the various orifices then should be balanced against the amount of liquid that it is desired to deliver on each cycle of operation. If the device is to be used with adrenaline, or perfume, then a recommended size for the various orifices will be orifice 70, a diameter of .020 inch; for main jet orifice 42, a diameter of .025 inch and for the outlet orifice a diameter of .035 inch. It is to be remembered that if the orifice size is too large, then too large a volume of liquid will be delivered for the same to be fully broken down into the fine mist desired.

In the operation of the device, the initial expulsion force is provided by squeezing the distortable polyethylene bottle as by finger pressure. If the bottle were entirely full of liquid of course the energy would be expended against the liquid itself, therefore the bottle should contain no more than about two-thirds of its capacity in liquid. There is a quantity of air contained in the bottle in addition to the liquid so the pressure is expended in compressing this air and the air in turn forces the liquid up through the delivery or feed tube 60. The same force that compresses the air tends to drive the air up through the two sets of air passages provided, the larger passages as 52, and the smaller passageways as 64. It is the air driven up through passageways 64 that first meets the liquid being fed through tube 60 and this meeting occurs in the mixing chamber jet 66 where an emulsification of the liquid begins. This rich mixture of liquid and air is forced up through the mixing jet and is there introduced into the primary mixing chamber 72 and then into the main emulsification chamber 40. It is to be noted that the amount of air supplied through passageways 52 will normally be greater than that supplied through passageways 64. In chamber 40 the emulsification is completed and the product discharged through the main atomizing jet having orifice 42.

There is now present a mechanical mixture of finely divided liquid with a high percentage of air and this is propelled with force into the nebulizing chamber 18 and as pressure is built up in the same, the turbulent mixture in aerosol form is discharged out through the outlet orifice 22 with the heavier particles impinging upon the cone-like surface 20. The larger particles of liquid either collect on the walls of chamber 18 or are held in suspension where they normally will be further vaporized and eventually passed out through the outlet orifice. In order to prevent a direct blow through from the main jet tube to the outlet orifice, a baffle member 80 is interposed so that any large globules of liquid will impinge thereon and will not be mechanically carried out through the outlet orifice.

When the required delivery is made from the nebulizer and the cycle is complete, a release of the pressure on the squeezed bottle will permit the bottle to return to its normal form and this will cause a thrust back through the various orifices. This usually will clean out of the nebulizing chamber any liquid remaining therein. If the device is to be carried in the pocket, then the closure cap 24 should be put in place after the showing of Figure 5 and screwed down until detent 26 fully seals any discharge out through outlet orifice 22. The cap normally is left in place until it is desired to use the device again at which time of course it must be removed before starting the cycle. This device serves as an efficient atomizer, for certain uses not requiring a fine aerosol, if the nebulizer chamber 18 is removed from the device.

It is believed that it will be clearly apparent from the above description and the disclosure in the drawings that the invention comprehends a novel construction of a squeeze bottle nebulizer.

Having thus disclosed the invention, I claim:

1. A hand spraying device such as a nebulizer or the like, comprising: a plastic squeeze bottle having an upwardly open mouth and a stopper positioned in said mouth, a removable cap covering and sealing said stopper and bottle mouth, said stopper being hollow and having formed therein in its upper portion a large primary chamber and a narrow-mouthed outlet orifice at the apex of said chamber, said stopper having a partition closing the bottom of said large chamber forming a smaller mixing chamber therebelow and said partition having a narrow-mouthed inlet orifice to said primary chamber, means forming the bottom of said lower chamber and having air and liquid passageways to the lower chamber, and said liquid passageway including a tube extending to the bottom of said bottle to provide a source of liquid to said lower chamber and including a valve acting by the force of liquid flow to terminate supply of liquid to said lower chamber shortly after the commencing of liquid flow, the bottom of said bottle forming a liquid reservoir to supply said tube.

2. The subject matter of claim 1 in which said tube is flexible and said valve is a foot valve at the lower end of said tube formed by a sleeve capping the lower end of said tube and having a tapered valve seat immediately below said tube and a floating valve below said valve seat in said sleeve with a tapered upper end to be carried upward by liquid passing to said tube to seal against said valve seat by means of the tapered valve and seat surfaces shortly after the commence of liquid flow.

3. The subject matter of claim 1 in which said stopper has a domed top and said top having in its center an inwardly extending conoidal recess formed by a conoidal separator wall extending into said primary chamber and said outlet orifice being centered therein and said cap has a conoidal detent positioned in said recess sealing the outlet orifice when in place, the cap and squeeze bottle mouth having inter-engaging threads and said stopper having abutment means acting on the upper edge of said bottle mouth to prevent escape of the stopper relative the bottle as said cap presses said detent in said recess.

4. The subject matter of claim 1 in which between said outlet and inlet orifices there is positioned a baffle target having a triangular cross section in the direction between the orifices with the triangle base facing said inlet orifice, the target being pyramidal in shape with its apex extending slightly beyond the line between the orifices from a wall of said stopper.

5. The subject matter of claim 1 in which partition means form an emulsion chamber, below said lower mixing chamber and immediately above the upper end of said tube, into which the liquid from said tube is passed and there being air inlet means to the emulsion chamber of less size than the air passageways to said lower chamber whereby an emulsion is produced in said emulsion chamber before the mixture of air and liquid therein is introduced to said lower chamber, there being a restricted orifice between said emulsion and lower chambers.

6. A nebulizer body to fit in the neck of a bottle, comprising: an inverted cup-shaped stopper with annular exterior walls adapted to be positioned in such neck, the lower inner walls of said stopper being annular and a thimble-like main jet positioned in the lower portion of said stopper and spaced from the top of said stopper defining a large primary mixing chamber therebetween, a lower emulsion jet member positioned in the lower portion of said main jet member and defining a second chamber below said primary chamber and above said emulsion jet member, means forming a passageway for liquid from the base of such bottle to said emulsion jet member and means forming a passageway for air from the top of such bottle to said emulsion jet member and three aligned orifices in the upper walls of said stopper, main jet member, and emulsion jet member, a nebulizer baffle target between the two upper orifices in said primary chamber and an inwardly extending wall around the orifice in the upper wall of said stopper acting as a separator.

7. Nebulizer means to be fitted in the mouth of a squeeze bottle providing a source of air under pressure, comprising: an inverted cup-shaped stopper adapted to be positioned in the mouth of such bottle and having an outlet orifice at its top, a thimble-like main jet member positioned in the lower portion of said stopper defining a primary mixing chamber thereabove, the top of said main jet member having a discharge orifice, an emulsion jet member positioned in the lower portion of said main jet member defining a secondary chamber thereabove and having a central passageway and a liquid supply tube positioned in said emulsion jet member, said emulsion jet member having a conical chamber immediately above the upper end of said tube and having air passageways therein to be supplied by such bottle communicating with said conical chamber, said emulsion jet member having an egress orifice at the top of said conical chamber and passageway means for providing air to said secondary chamber from said bottle.

8. The subject matter of claim 7 in which said emulsion jet member has an inverted conical recess in its top in which said egress orifice is centered forming a subsidiary chamber in the base of said secondary chamber.

9. A hand spraying device such as a nebulizer or the like, comprising: a plastic squeeze bottle, the lower portion of said bottle forming a liquid reservoir and the upper portion of said bottle forming an air chamber, said bottle having an upwardly open mouth and a stopper positioned in said mouth, said stopper being hollow and having formed therein in its upper portion a mixing chamber, said stopper having a domed top and said top having at its center an inwardly tapered recess formed by a wall extending downwardly into said mixing chamber and having an outlet orifice centered therein, a removable cap covering and sealing said stopper and bottle mouth, said cap having a downwardly tapered detent positioned in said recesses sealing the outlet orifice when in place, the cap and squeeze bottle mouth having inter-engaging threads, and jet means in the lower portion of said stopper connecting to the inside of said bottle for supply of liquid and air therefrom and directing a mixed stream of liquid and air into said mixing chamber upon squeezing of said bottle.

10. A nebulizer, comprising: a housing forming a mixing chamber having an outlet orifice in one end and having jet means at its other end, said jet means including a liquid reservoir and manually operable means for supplying liquid from reservoir to said chamber under pressure and a source of air to be mixed with said liquid, and a nebulizer baffle target positioned in said chamber having a triangular cross section in the direction between said orifice and said jet means, the target being pyramidal in shape with its apex extending slightly beyond said line between said orifice and said jet means.

References Cited in the file of this patent

UNITED STATES PATENTS

| 1,042,556 | Holland | Oct. 29, 1912 |
| 2,571,504 | Vuillemenot | Oct. 16, 1951 |
| 2,615,676 | Neubauer | Oct. 28, 1952 |
| 2,654,585 | Heesen | Oct. 6, 1953 |
| 2,663,463 | Benbury | Dec. 22, 1953 |
| 2,695,813 | Risanowski | Nov. 30, 1954 |

FOREIGN PATENTS

| 482,881 | Canada | Apr. 29, 1952 |